United States Patent
Scanlon et al.

(10) Patent No.: US 9,598,658 B2
(45) Date of Patent: Mar. 21, 2017

(54) LUBRICANT COMPOSITION HAVING IMPROVED NON-NEWTONIAN VISCOMETRICS

(75) Inventors: Eugene Scanlon, Mamaroneck, NY (US); Kevin DeSantis, Upper Nyack, NY (US); Virginie Bette, Mannheim (DE); Jochen Petzoldt, Weisenheim am Berg (DE)

(73) Assignee: BASF SE, Ludwigshafen (DE)

( * ) Notice: Subject to any disclaimer, the term of this patent is extended or adjusted under 35 U.S.C. 154(b) by 188 days.

(21) Appl. No.: 13/428,919

(22) Filed: Mar. 23, 2012

(65) Prior Publication Data

US 2012/0245068 A1     Sep. 27, 2012

Related U.S. Application Data

(60) Provisional application No. 61/467,726, filed on Mar. 25, 2011.

(51) Int. Cl.
| | |
|---|---|
| *C10M 145/14* | (2006.01) |
| *C10M 149/04* | (2006.01) |
| *C08F 220/18* | (2006.01) |
| *C08F 220/14* | (2006.01) |

(52) U.S. Cl.
CPC ......... *C10M 145/14* (2013.01); *C08F 220/18* (2013.01); *C10M 149/04* (2013.01); *C08F 220/14* (2013.01); *C08F 2220/1833* (2013.01); *C10M 2209/084* (2013.01); *C10N 2220/021* (2013.01); *C10N 2230/02* (2013.01); *C10N 2230/08* (2013.01); *C10N 2270/00* (2013.01)

(58) Field of Classification Search
CPC  C10M 143/00; C10M 149/00; C10M 155/00; C10M 2205/00; C10M 145/14; C10M 149/04; C10M 2209/084; C08F 220/18; C08F 2220/1833; C08F 220/14; C10N 2220/021; C10N 2230/08; C10N 2270/00; C10N 2230/02
USPC ...................................................... 508/110
See application file for complete search history.

(56) References Cited

U.S. PATENT DOCUMENTS

| | | | |
|---|---|---|---|
| 4,867,894 A | | 9/1989 | Pennewiss et al. |
| 5,412,049 A | | 5/1995 | Argyropoulos et al. |
| 5,821,313 A | | 10/1998 | Sivik et al. |
| 5,834,408 A | | 11/1998 | Mishra et al. |
| 5,843,874 A | | 12/1998 | Macpherson et al. |
| 6,124,249 A | * | 9/2000 | Seebauer et al. ............. 508/469 |
| 6,323,164 B1 | | 11/2001 | Liesen et al. |
| 6,787,663 B2 | | 9/2004 | Adams et al. |
| 7,989,407 B2 | | 8/2011 | Habeeb et al. |
| 8,143,202 B2 | | 3/2012 | Peer et al. |
| 8,153,721 B2 | | 4/2012 | Balk et al. |
| 2007/0197407 A1 | | 8/2007 | Bardasz et al. |
| 2007/0219101 A1 | | 9/2007 | Scherer et al. |
| 2008/0076687 A1 | | 3/2008 | Habeeb et al. |
| 2008/0108533 A1 | | 5/2008 | Peer et al. |
| 2008/0269093 A1 | | 10/2008 | Price |
| 2011/0092635 A1 | | 4/2011 | Venkatesh et al. |

FOREIGN PATENT DOCUMENTS

| | | |
|---|---|---|
| EP | 0750031 A2 | 12/1996 |
| JP | 05-070403 A | 3/1993 |
| WO | WO 2008/152017 A1 | 12/2008 |
| WO | WO 2009/135812 A1 | 11/2009 |
| WO | WO 2009/153162 A1 | 12/2009 |

OTHER PUBLICATIONS

English language abstract and machine-assisted translation for JP 05-070403 extracted from the PAJ database on Jun. 7, 2012, 36 pages.
English language abstract for WO 2008/152017 extracted from the espacenet.com database on Jun. 7, 2012, 28 pages.
English language abstract and machine-assisted translation for WO 2009/135812 extracted from the espacenet.com database on Jun. 7, 2012, 52 pages.
English language abstract for WO 2009/153162 extracted from the espacenet.com database on Jun. 7, 2012, 31 pages.
International Search Report for Application No. PCT/US2012/030415 dated Jul. 31, 2012, 3 pages.

* cited by examiner

*Primary Examiner* — Taiwo Oladapo
(74) *Attorney, Agent, or Firm* — Howard & Howard Attorneys PLLC

(57) ABSTRACT

A lubricant composition having improved non-Newtonian viscometrics includes at least 85 weight percent of a base oil and 1 to 15 weight percent of a lubricant additive. The additive itself includes 10 to 80 weight percent of a diluent oil and 30 to 80 weight percent of a random co-polymeric viscosity index improver. The viscosity index improver is the free-radical polymerization product of at least 5 to 15 weight percent methyl methacrylate and 5 to 95 weight percent of a $C_8$-$C_{10}$ alkyl (meth)acrylate. The additive is formed using a method that includes the step of providing the diluent oil, the methyl methacrylate, the $C_8$-$C_{10}$ alkyl (meth)acrylate, and a free-radical initiator. The method also includes the steps of flowing the diluent oil into a reactor, flowing the methyl methacrylate and the $C_8$-$C_{10}$ alkyl (meth)acrylate into the reactor independently from the free-radical initiator, and flowing the free-radical initiator into the reactor.

6 Claims, No Drawings

LUBRICANT COMPOSITION HAVING IMPROVED NON-NEWTONIAN VISCOMETRICS

FIELD OF THE DISCLOSURE

The present disclosure generally relates to a lubricant composition having improved non-Newtonian viscometrics and a particular Brookfield Viscosity measured at low temperature. More specifically, the lubricant composition includes a lubricant additive including a diluent oil and a co-polymeric viscosity index improver being the free-radical polymerization product of at least methyl methacrylate and a $C_8$-$C_{10}$ alkyl (meth)acrylate.

DESCRIPTION OF THE RELATED ART

Lubricant compositions are generally well known in the art and are broadly categorized as oil or water based compositions, i.e., compositions that include large weight percentages of non-polar compounds (such as (base) oils) or large weight percentages of water, respectively. Lubricant compositions are typically further categorized as engine oils, driveline system oils, gear oils, automatic and manual transmission fluids and oils, hydraulic oils, industrial gear oils, turbine oils, rust and oxidation (R&O) inhibited oils, compressor oils, or paper machine oils, etc. Each of these compositions has particular specifications and design requirements. However, many are susceptible to unacceptable increases in thickening at low temperatures and unacceptable losses of viscosity at high temperatures.

For this reason, additives can be utilized to improve the low and high temperature properties of the compositions. These additives tend to be poly alkyl methacrylates, styrenated polyesters, alkylated polystyrenes, ethylene-vinyl acetates, vinyl acetate-fumarates, esterified olefinics, styrene maleic anhydrides, and alkylated naphthalenes. However, these additives can negatively interact with other components, can lack stability in shear fields, can increase gelation indices, tend to be expensive to manufacture and purchase, and typically must be used in large quantities (i.e., at large treat rates) in the lubricant compositions. As a result, the cost of the lubricant compositions is increased. In addition, some of these additives that are known to be multi-functional additives are only minimally effective and tend to be expensive to both manufacture and purchase. Accordingly, there remains an opportunity to develop an improved composition and additive.

SUMMARY OF THE DISCLOSURE AND ADVANTAGES

The instant disclosure provides a lubricant composition having improved non-Newtonian viscometrics. The composition includes at least 85 weight percent of a base oil and 1 to 15 weight percent of a lubricant additive, each based on a total weight of the composition. The additive itself includes 10 to 80 weight percent of a diluent oil and 30 to 80 weight percent of a random co-polymeric viscosity index improver, each based on a total weight of the additive. The random co-polymeric viscosity index improver is the free-radical polymerization product of at least 5 to 15 weight percent methyl methacrylate and 5 to 95 weight percent of a $C_8$-$C_{10}$ alkyl (meth)acrylate, each based on a total weight of the viscosity index improver. The composition has a Brookfield Viscosity of less than about 20,000 mPa·s measured at −40° C. according to ASTM D2983.

The disclosure also provides a method of forming the additive. The method includes the step of providing the diluent oil, the methyl methacrylate, the $C_8$-$C_{10}$ alkyl (meth)acrylate, and a free-radical initiator. The method also includes the steps of flowing the diluent oil into a reactor, flowing the methyl methacrylate and the $C_8$-$C_{10}$ alkyl (meth)acrylate into the reactor independently from the free-radical initiator, and flowing the free-radical initiator into the reactor such that upon combination of the diluent oil, the methyl methacrylate, the $C_8$-$C_{10}$ alkyl (meth)acrylate, and the free-radical initiator, a free-radical polymerization reaction is initiated and the viscosity index improver is formed.

The methyl methacrylate of the additive contributes to the cleanliness of the additive, and of the composition as a whole, upon use of the composition and depolymerization of the additive. The $C_8$-$C_{10}$ alkyl (meth)acrylate allows the additive to be soluble in the composition and minimizes, or prevents, the copolymer from co-crystallizing with waxes that may be present in the composition which improves the low temperature non-Newtonian viscometrics of both the additive itself and the composition. In addition, at low temperatures, the viscosity index improver coils very tightly and contributes little to the viscosity of the additive or the lubricant composition. At high temperatures, the viscosity index improver uncoils and acts to limit loss of viscosity due to thinning of both the additive and the lubricant composition. Furthermore, the additive effectively improves the non-Newtonian viscometrics of the composition when utilized at low treat rates. Moreover, the additive minimally interacts with other components present in the composition, exhibits stability in shear fields, and minimizes gelation indices, thereby improving the non-Newtonian viscometrics of the composition.

DETAILED DESCRIPTION OF THE DISCLOSURE

The present disclosure provides a lubricant composition (hereinafter referred to as the "composition"). The composition can be further described as a final or ultimate lubricant composition, as a fully formulated lubricant, or alternatively as an engine oil, hydraulic fluid, transmission fluid, etc. In one embodiment, the terminology fully formulated lubricant refers to a total final composition that is a final commercial oil/fluid. The composition may be further defined as, or be utilized in, automatic transmission fluids, manual transmission fluids, hydraulic fluids, greases, gear fluids, metalworking fluids, industrial fluids, engine oil applications, crankcase motor oil, and shock absorber fluids.

The composition has improved non-Newtonian viscometrics. As is known in the art, the terminology "non-Newtonian" typically describes a fluid whose viscosity is variable based on applied stress, i.e., whose viscosity changes when a gradient in flow speed changes. The composition has improved non-Newtonian viscometrics as typically evidenced by its low viscosity at low temperatures and increased viscosity at high temperatures.

The composition has a Brookfield Viscosity of less than about 20,000 mPa·s measured at −40° C. according to ASTM D2983. In various embodiments, the composition has a Brookfield Viscosity of from 5,000 to 10,000, from 10,000 to 15,000, from 15,000 to 20,000, less than 15,000, less than 10,000, less than 9,000, less than 8,000, etc., mPa·s measured at −40° C. according to ASTM D2983. Most typically, the composition is measured using an uninsulated No. 4 LV or an insulated No. 4B2 spindle and a speed of rotation that ranges from about 0.6 rpm for a fluid with a viscosity range of from about 400,000 to about 1,000,000 mPa·s to about 60.0 rpm for a fluid with a viscosity range of about 500 to about 9,800 mPa·s. In other embodiments, the composition has a kinematic viscosity of from 1 to 100, from 2 to 50, or from 2.5 to 40, mm$^2$/s according to ASTM D445. It is also contemplated that the composition may have a viscosity, as determined using a mini-rotational viscometer (MRV), of less than 60,000, 50,000, or 40,000, mPa·s, measured at −15° C. according to ASTM D4684. The composition may also have a viscosity, as determined using a cold cranking simulator (CCS), of less than about 5,000, 4,000, or 3,000, mPa·s measured at −30° C. according to ASTM D5293. Even further, the composition may have a DKA oxidation increase of less than 30, 25, 20, 15, 10, or 5, percent, as determined using the method set forth in CEC-L-48-00 at 40° C. or 100° C.

Base Oil:

The composition includes at least about 85 weight percent of a base oil, based on a total weight of the composition. In various embodiments, the composition includes at least about 90, at least about 95, or at least about 99 weight percent of the base oil, based on a total weight of the composition. In other embodiments, the composition includes (about) 85 to 99.9, 85 to 99, 85 to 95, 85 to 90, 90 to 99.9, 90 to 99, 90 to 95, 95 to 99.9, 95 to 99, or 99 to 99.9, weight percent of the base oil based on a total weight of the composition.

The base oil is not particularly limited and may be further defined as including one or more oils of lubricating viscosity such as natural and synthetic lubricating or base oils and mixtures thereof. In one embodiment, the base oil is further defined as a lubricant. In another embodiment, the base oil is further defined as an oil of lubricating viscosity. In still another embodiment, the base oil is further defined as a crankcase lubricating oil for spark-ignited and compression ignited internal combustion engines, including automobile and truck engines, two-cycle engines, aviation piston engines, and marine and railroad diesel engines. Alternatively, the base oil can be further defined as an oil to be used in gas engines, stationary power engines, and turbines. The base oil may be further defined as a heavy or light duty engine oil. In one embodiment, the base oil is further defined as a heavy duty diesel engine oil. Alternatively, the base oil may be described as an oil of lubricating viscosity or lubricating oil, for instance as disclosed in U.S. Pat. No. 6,787,663 and U.S. 2007/0197407, each of which is expressly incorporated herein by reference relative to the base oil. Alternatively, the base oil may be used in or as an engine oil, driveline system oil, gear oil, automatic and manual transmission fluid or oil, hydraulic oil, industrial gear oil, turbine oil, rust and oxidation (R&O) inhibited oil, compressor oil, or paper machine oil, etc.

The base oil may be further defined as a base stock oil. Alternatively, the base oil may be further defined as a component that is produced by a single manufacturer to the same specifications (independent of feed source or manufacturer's location) that meets the same manufacturer's specification and that is identified by a unique formula, product identification number, or both. The base oil may be manufactured or derived using a variety of different processes including but not limited to distillation, solvent refining, hydrogen processing, oligomerization, esterification, and re-refining. Re-refined stock is typically substantially free from materials introduced through manufacturing, contamination, or previous use. In one embodiment, the base oil is further defined as a base stock slate, as is known in the art.

Alternatively, the base oil may be derived from hydrocracking, hydrogenation, hydrofinishing, refined and re-refined oils or mixtures thereof or may include one or more such oils. In one embodiment, the base oil is further defined as an oil of lubricating viscosity such as a natural or synthetic oil and/or combinations thereof. Natural oils include, but are not limited to, animal oils and vegetable oils (e.g., castor oil, lard oil) as well as liquid petroleum oils and solvent-treated or acid-treated mineral lubricating oils such as paraffinic, naphthenic or mixed paraffinic-naphthenic oils.

In various other embodiments, the base oil may be further defined as an oil derived from coal or shale. Non-limiting examples of suitable oils include hydrocarbon oils such as polymerized and interpolymerized olefins (e.g., polybutylenes, polypropylenes, propylene-isobutylene copolymers, poly(1-hexenes), poly(1-octenes), poly(1-decenes), and mixtures thereof; alkylbenzenes (e.g., dodecylbenzenes, tetradecylbenzenes, dinonylbenzenes, and di(2-ethylhexyl)-benzenes); polyphenyls (e.g., biphenyls, terphenyls, and alkylated polyphenyls), alkylated diphenyl ethers and alkylated diphenyl sulfides and the derivatives, analogs, and homologs thereof.

In still other embodiments, the base oil may be further defined as a synthetic oil which may include one or more alkylene oxide polymers and interpolymers and derivatives thereof wherein terminal hydroxyl groups are modified by esterification, etherification, or similar reactions. Typically, these synthetic oils are prepared through polymerization of ethylene oxide or propylene oxide to form polyoxyalkylene polymers which can be further reacted to form the oils. For example, alkyl and aryl ethers of these polyoxyalkylene polymers (e.g., methylpolyisopropylene glycol ether having an average molecular weight of 1,000; diphenyl ether of polyethylene glycol having a molecular weight of 500-1,000; and diethyl ether of polypropylene glycol having a molecular weight of 1,000-1,500) and/or mono- and polycarboxylic esters thereof (e.g. acetic acid esters, mixed $C_3$-$C_8$ fatty acid esters, or the $C_{13}$ oxo acid diester of tetraethylene glycol) may also be utilized.

In even further embodiments, the base oil may include esters of dicarboxylic acids (e.g., phthalic acid, succinic acid, alkyl succinic acids and alkenyl succinic acids, maleic acid, azelaic acid, suberic acid, sebacic acid, fumaric acid, adipic acid, linoleic acid dimer, malonic acid, alkyl malonic acids, and alkenyl malonic acids) with a variety of alcohols (e.g., butyl alcohol, hexyl alcohol, dodecyl alcohol, 2-ethylhexyl alcohol, ethylene glycol, diethylene glycol monoether, and propylene glycol). Specific examples of these esters include, but are not limited to, dibutyl adipate, di(2-ethylhexyl sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid, and combinations thereof. Esters useful as the base oil or as included in the base oil also include those formed from $C_5$ to $C_{12}$ monocarboxylic acids and polyols and polyol ethers such as neopentyl glycol, trimethylolpropane, pentaerythritol, dipentaerythritol, and tripentaerythritol.

The base oil may be alternatively described as a refined and/or re-refined oil, or combinations thereof. Unrefined oils are typically obtained from a natural or synthetic source without further purification treatment. For example, a shale oil obtained directly from retorting operations, a petroleum oil obtained directly from distillation, or an ester oil obtained directly from an esterification process and used without further treatment, could all be utilized in this disclosure. Refined oils are similar to the unrefined oils except that they typically have undergone purification to improve one or more properties. Many such purification techniques are known to those of skill in the art such as solvent extraction, acid or base extraction, filtration, percolation, and similar purification techniques. Re-refined oils are also known as reclaimed or reprocessed oils and often are additionally processed by techniques directed to removal of spent additives and oil breakdown products.

The base oil may alternatively be described as specified in the American Petroleum Institute (API) Base Oil Interchangeability Guidelines. In other words, the base oil may be further described as one or a combination of more than one of five base oil groups: Group I (sulfur content >0.03 wt %, and/or <90 wt % saturates, viscosity index 80-120); Group II (sulfur content less than or equal to 0.03 wt %, and greater than or equal to 90 wt % saturates, viscosity index 80-120); Group III (sulfur content less than or equal to 0.03 wt %, and greater than or equal to 90 wt % saturates, viscosity index greater than or equal to 120); Group IV (all polyalphaolefins (PAO's)); and Group V (all others not included in Groups I, II, III, or IV). In one embodiment, the base oil is selected from the group consisting of API Group I, II, III, IV, V and combinations thereof. In another embodiment, the base oil is selected from the group consisting of API Group II, III, IV, and combinations thereof. In still another embodiment, the base oil is further defined as an API Group II, III, or IV oil and includes a maximum of about 49.9 wt %, typically up to a maximum of about 40 wt %, more typically up to a maximum of about 30 wt %, even more typically up to a maximum of about 20 wt %, even more typically up to a maximum of about 10 wt % and even more typically up to a maximum of about 5 wt % of the lubricating oil an API Group I or V oil. It is also contemplated that Group II and Group II basestocks prepared by hydrotreatment, hydrofinishing, hydroisomerzation or other hydrogenative upgrading processes may be included in the API Group II described above. Moreover, the base oil may include Fisher Tropsch or gas to liquid GTL oils. These are disclosed for example in U.S. 2008/0076687, which is expressly incorporated herein by reference. In one embodiment, the base oil is further defined as a commercial motor oil. In another embodiment, the base oil is as described in US 2008/0108533, incorporated herein by reference relative to base oils.

Lubricant Additive:

In addition to the base oil, the composition also includes about 1 to about 15 weight percent of a lubricant additive (hereinafter referred to as the "additive") based on a total weight of the composition. In various embodiments, the composition includes the base oil in one of the weight percents described above and a balance of the additive. In other embodiments, the additive is present in amount of from 1 to 14, 2 to 13, 3 to 12, 4 to 11, 5 to 10, 6 to 9, or 7 to 8, weight percent based on a total weight of the composition.

Diluent Oil:

The additive itself includes about 10 to about 80 weight percent of a diluent oil based on a total weight of the additive. In various embodiments, the diluent oil is present in an amount of from about 20 to about 70, of from about 30 to about 60, from about 30 to about 50, or from about 40 to about 50, weight percent based on a total weight of the additive. Alternatively, the diluent oil may be present in amounts of greater than 10, 15, 20, 25, 30, 35, 40, 45, 50, 55, 60, 65, 70, or 75 (and up to 80 for each) weight percent based on a total weight of the additive. The diluent oil may be the same as the base oil, may be any one or more of the options for the base oil described above, or may be different from those options described above. In one embodiment, the diluent oil is further defined as mineral oil.

Random Co-Polymeric Viscosity Index Improver:

The additive also includes about 30 to about 80 weight percent of a random co-polymeric viscosity index improver (hereinafter referred to as the "viscosity improver") based on a total weight of the additive. The terminology "random" typically describes the viscosity improver as a random co-polymer (and not a gradient-, block-, or star-copolymer) as known in the art. In various embodiments, the viscosity improver is present in amounts of from about 40 to about 70, or from about 50 to about 60, weight percent based on a total weight of the additive. Alternatively, the viscosity improver may be present in amounts of from about 35 to about 75, from about 45 to about 65, or from about 55 to about 60, weight percent based on a total weight of the additive. In one embodiment, the viscosity improver is included in the additive in an amount of from about 50 to about 75 weight percent, based on a total weight of the additive, and the composition is further defined as an automatic transmission fluid. In another embodiment, the viscosity improver is included in the additive in an amount of from about 40 to about 60 weight percent, based on a total weight of the additive, and the composition is further defined as a hydraulic fluid. In still another embodiment, the viscosity improver is included in the additive in an amount of from about 65 to about 80 weight percent, based on a total weight of the additive, and the composition is further defined as a manual transmission fluid. In various embodiments, the additive consists essentially of or consists of the diluent oil and the viscosity improver. In embodiments that consist essentially of the diluent oil and the viscosity improver, the additive is typically free of materials or material compounds that affect the basic properties of the additive including, but not limited to, additives that are not representative of this disclosure, (co)polymers of butyl methacrylate and/or $C_2$-$C_4$ (meth) acrylates, and/or amounts of additives that those of skill in the art would recognize change the basic properties of the additives, the ability of the additive to positively affect the non-Newtonian viscometrics of the composition, and/or the ability of the additive to positively affect the Brookfield, kinematic, and other viscosities described above, and/or the DKA oxidation increase, of the composition.

The co-polymeric viscosity improver itself is most typically a branched random copolymer, e.g. a random copolymer that includes a linear backbone with branched side chains. Alternatively, the branched random copolymer may include a branched backbone and linear side chains or a branched backbone and branched side chains. Without intending to be bound by any particular theory, it is believed that the branched side chains reduce wax crystallization onto the viscosity improver when the composition is in use and also reduces gelling and solid formation when the composition is in use. However, it is also contemplated that the viscosity improver itself may be crosslinked, structured, lightly structured, or linear.

The viscosity improver is not particularly limited relative to number average molecular weight, weight average molecular weight, and/or polydispersity index. However, in various embodiments, the viscosity improver has a number average molecular weight of from about 10,000 to about 200,000, of from about 10,000 to about 150,000, of from about 10,000 to about 100,000, of from about 10,000 to about 75,000, of from about 5,000 to about 50,000, of from about 10,000 to about 40,000, or from about 20,000 to about 30,000, or of from about 10,000 to about 15,000, g/mol. In other embodiments, the viscosity improver has a weight average molecular weight of from about 20,000 to about 500,000, of from about 20,000 to about 450,000, of from about 20,000 to about 400,000, of from about 20,000 to about 350,000, of from about 20,000 to about 300,000, of from about 20,000 to about 250,000, of from about 20,000 to about 200,000, of from about 20,000 to about 150,000, of from about 20,000 to about 100,000, of from about 10,000 to about 70,000, of from about 20,000 to about 60,000, or from about 30,000 to about 50,000, of from about 40,000 to 50,000, or of from about 20,000 to about 30,000, g/mol. In still further embodiments, the viscosity improver has a polydispersity index (PDI) of from about 1 to about 5, from about 1 to about 4, from about 1 to about 3, from about 1 to about 2, from about 1.5 to about 2, or from about 1.7 to about 1.8. Alternatively, the viscosity improver may have a PDI of from 1 to 4, from 1 to 3, from 1 to 2, from 1.5 to 3.5, from 1.5 to 2.5, or from 1.5 to 2. In even other embodiments, the viscosity improver has a PDI of from 2 to 4 or up to about 4 when the viscosity improver has a weight average molecular weight of greater than about 200,000 g/mol. In still other embodiments, the viscosity improver has a PDI of from 1 to 4, from 1 to 3, from 1 to 2, from 1.5 to 3.5, from 1.5 to 2.5, or from 1.5 to 2, when the viscosity improver has a weight average molecular weight of less than about 100,000 or less than about 50,000, g/mol.

The viscosity improver may also have an improved thickening effect when used in the composition. Typically, this effect is measured in (mm²/s of the composition)/(mole of the viscosity improver). In various embodiments, the viscosity improver has a thickening effect of from about 40,000 to about 300,000, of from about 200,000 to about 600,000, or of from about 500,000 to about 2,500,000, mm²/s/mole of the viscosity improver. It is contemplated that the aforementioned values may be related to molecular weight of the viscosity improver and thus may vary from the aforementioned ranges of values. For example, viscosity improvers with large molecular weights may thicken to degrees even greater than what is described immediately above.

Free-Radical Polymerization Product:

The viscosity improver may be, or may include, the free-radical polymerization product of methyl methacrylate and a $C_8$-$C_{10}$ alkyl (meth)acrylate, each of which is described in detail below. Most typically, the viscosity improver is the free-radical polymerization product. In one embodiment, the viscosity improver is further defined as the free-radical polymerization product of the methyl methacrylate, the $C_8$-$C_{10}$ alkyl (meth)acrylate, and one or more additional monomers, also described in greater detail below. Typically, the free-radical polymerization product itself, and thus the viscosity improver, is free of extraneous polymerization products (free-radical or otherwise) that are not representative of this disclosure, extraneous monomers, whether organic or inorganic, extraneous solvents or fluids, and/or other compounds appreciated by those of skill in the art. In another embodiment, the viscosity improver is free of $C_2$-$C_7$ alkyl (meth)acrylates, such as butyl (meth)acrylate, whether polymerized or in monomeric form. In still another embodiment, the viscosity improver is free of $C_{11}$ and larger alkyl (meth)acrylates whether free or polymerized with themselves or with the methyl methacrylate or the $C_8$-$C_{10}$ alkyl (meth)acrylate. In a further embodiment, the viscosity improver is free of $C_{19}$ and larger alkyl (meth)acrylates whether free or polymerized with themselves or with the methyl methacrylate or the $C_8$-$C_{10}$ alkyl (meth)acrylate. It is also contemplated that viscosity improver may include minor amounts of one or more of the aforementioned compounds so long as these minor amounts do not affect the basic properties of viscosity improver, or the disclosure as a whole, as appreciated by those of skill in the art. The terminology "(meth)acrylate" used herein describes both methacrylates and acrylates (with no methyl group).

Methyl Methacrylate:

Referring back to the methyl methacrylate (MMA), the MMA is utilized in the free-radical polymerization reaction to form the free-radical polymerization product. Most typically, the MMA is used in an amount of from about 5 to about 15 weight percent, based on a total weight of the viscosity improver. Said differently, the viscosity improver is the free-radical polymerization product of from about 5 to about 15 weight percent of the MMA, based on a total weight of the viscosity improver, in addition to a particular weight percent of the $C_8$-$C_{10}$ alkyl (meth)acrylate described below. In various embodiments, the MMA is used in amounts from about 5 to about 10, from about 10 to about 15, from about 5 to about 14, from about 6 to about 13, from about 7 to about 12, from about 8 to about 11, or from about 9 to about 10, weight percent, based on a total weight of the viscosity improver. It is contemplated that the MMA may be present/used in any whole or fractional amount or range of amounts within the ranges set forth above.

$C_8$-$C_{10}$ Alkyl (Meth)Acrylate:

The $C_8$-$C_{10}$ alkyl (meth)acrylate is not particularly limited and may include any one or more alkyl acrylates and/or alkyl methacrylates wherein the alkyl group of the (meth)acrylate includes 8, 9, or 10 carbon atoms, isomers thereof, and combinations thereof. For illustrative purposes only, the $C_8$-$C_{10}$ alkyl (meth)acrylate has a chemical structure as set forth immediately below:

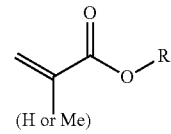

wherein R is an alkyl group that has 8, 9, or 10 carbon atoms. The alkyl group may be linear, branched, or cyclic. In one embodiment, the $C_8$-$C_{10}$ alkyl (meth)acrylate is further defined as 2-ethylhexyl methacrylate ($C_8$) as set forth below:

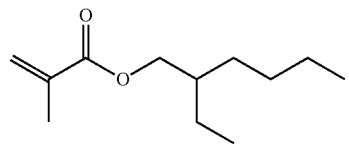

2-ethylhexyl methacrylate

In another embodiment, the $C_8$-$C_{10}$ alkyl (meth)acrylate is further defined as 2-propylheptyl methacrylate (2-PHMA) ($C_{10}$) (also known as 2-propenoic acid, 2-methyl-,2-propylheptyl ester), as set forth below:

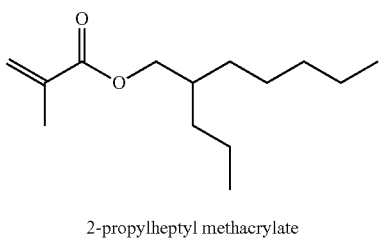 [SMILES: C=C(C)C(=O)OCC(CCC)CCCCC]

2-propylheptyl methacrylate

In still other embodiments, the $C_8$-$C_{10}$ alkyl (meth)acrylate is further defined as a combination or mixture of 2-propenoic acid, 2-methyl-,2-propylheptyl ester; 2-propenoic acid, 2-methyl-,4-methyl-2-propylhexyl ester; and 2-propenoic acid, 2-methyl-,5-methyl-2-propylhexyl ester.

Most typically, the $C_8$-$C_{10}$ alkyl (meth)acrylate is utilized in the free-radical polymerization reaction to form the free-radical polymerization product in an amount of from about 5 to about 95 weight percent, based on a total weight of the viscosity improver. In various embodiments, the $C_8$-$C_{10}$ alkyl (meth)acrylate is utilized in amounts of from about 10 to about 90, of from about 15 to about 85, of from about 20 to about 80, of from about 25 to about 75, of from about 30 to about 70, of from about 35 to about 65, of from about 40 to about 60, of from about 45 to about 55, or from about 45 to about 50, weight percent, based on a total weight of the viscosity improver. It is contemplated that the $C_8$-$C_{10}$ alkyl (meth)acrylate may be present/used in any whole or fractional amount or range of amounts within the ranges set forth above.

One or More Additional Monomers:

Referring back, the one or more additional monomers first introduced above may include one or more $C_{12}$-$C_{18}$ alkyl (meth)acrylates. The $C_{12}$-$C_{18}$ alkyl (meth)acrylate(s) is not particularly limited and may include any one or more alkyl acrylates and/or alkyl methacrylates wherein the alkyl group of the (meth)acrylate includes 12, 13, 14, 15, 16, 17, or 18 carbon atoms, isomers thereof, and combinations thereof. For illustrative purposes only, the $C_{12}$-$C_{18}$ alkyl (meth)acrylate(s) has a chemical structure as set forth immediately below:

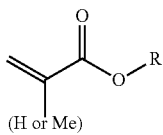

(H or Me)

wherein R is an alkyl group that has 12, 13, 14, 15, 16, 17, or 18 carbon atoms. The alkyl group may be linear, branched, or cyclic. In one embodiment, the $C_{12}$-$C_{18}$ alkyl (meth)acrylate is further defined as one or more compounds known in the art as lauryl methacrylate. Typically, lauryl methacrylate includes a mixture of alkyl (meth)acrylates having 12, 14, 16, and optionally 18, carbon atoms. In various embodiments, the aforementioned methacrylate is further defined as a $C_{12}$-$C_{16}$ alkyl (meth)acrylate and/or as including primarily $C_{12}$, $C_{14}$, and $C_{16}$ esters. The $C_{12}$-$C_{18}$ alkyl (meth)acrylate may be as described in US 2008/0108533, incorporated herein by reference relative to alkyl groups that have 12, 13, 14, 15, 16, 17, or 18 carbon atoms.

In one embodiment, the $C_{12}$-$C_{18}$ alkyl (meth)acrylate is utilized in the free-radical polymerization reaction to form the free-radical polymerization product in an amount of from about 5 to about 90 weight percent, based on a total weight of the viscosity improver. In various other embodiments, the $C_{12}$-$C_{18}$ alkyl (meth)acrylate is utilized in amounts of from about 10 to about 85, of from about 15 to about 80, of from about 20 to about 75, of from about 25 to about 70, of from about 30 to about 65, of from about 35 to about 60, of from about 40 to about 55, of from about 45 to about 505, weight percent, based on a total weight of the viscosity improver. It is contemplated that the $C_{12}$-$C_{18}$ alkyl (meth)acrylate may be present/used in any whole or fractional amount or range of amounts within the ranges set forth above.

It is also contemplated that one or more of the additional monomers may be further defined as, or include, a $C_{16}$-$C_{22}$ alkyl (meth)acrylate which may include any one or more alkyl acrylates and/or alkyl methacrylates wherein the alkyl group of the (meth)acrylate includes 16, 17, 18, 19, 20, 21, or 22, carbon atoms, isomers thereof, and combinations thereof. For illustrative purposes only, the $C_{16}$-$C_{22}$ alkyl (meth)acrylate has a chemical structure as set forth immediately below:

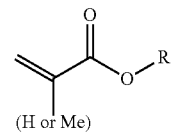

(H or Me)

wherein R is an alkyl group that has 16, 17, 18, 19, 20, 21, or 22, carbon atoms. The alkyl group may be linear, branched, or cyclic. Most typically, the $C_{16}$-$C_{22}$ alkyl (meth)acrylate is polymerized with itself to form a pour point depressant (PPD) that is optionally included in the composition, the additive, or both the composition and the additive.

In addition to, or in the alternative, the one or more monomers may include one or more secondary or tertiary amine functional (meth)acrylates. In one embodiment, the amine functional (meth)acrylate has the following structure:

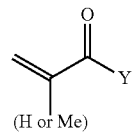

(H or Me)

wherein Y includes a secondary or tertiary amine and/or has the formula:

(a) $N(R^1)_2R^2N(R^3)_2$ wherein each $R^1$ is independently a hydrogen atom or an alkyl group having from 1 to 5 carbon atoms, $R^2$ is independently an alkyl group having from 1 to 5 carbon atoms, and $R^3$ is independently an alkyl group having from 1 to 5 carbon atoms or a hydrogen atom, or (b) $OR^4N(R^5R^6)$ wherein $R^4$ is an alkyl group having from 1 to 5 carbon atoms and each of $R^5$ and $R^6$ is independently a hydrogen atom or an alkyl group having 1 to 4 carbon atoms.

Relative to formula (a) $N(R^1)_2R^2N(R^3)_2$, each alkyl group may independently have 1, 2, 3, or 4 carbon atoms. Each alkyl group may have the same number of carbon atoms or they may have a different numbers of carbon atoms. The alkyl group may be linear, branched, or cyclic. Typically, relative to formula (b), the compound is further defined as an acrylamide. In one embodiment, Y is further defined as $NR^1R^2N(CH_3)_2$ wherein $R^1$ is a hydrogen atom or an alkyl group having from 1 to 5 carbon atoms, $R^2$ is a second alkyl group having from 1 to 5 carbon atoms, and $R^3$ is a methyl group. In another embodiment, the compound is further defined as dimethylaminopropyl methacrylamide (also known in the art as DMAPMA) that has the following structure:

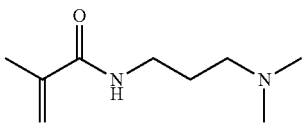

dimethylaminopropyl methacrylamide

Relative to formula (b) $OR^4N(R^5R^6)$, $R^4$ may be further defined as an alkyl group having from 1, 2, 3, or 4 carbon atoms. Similarly, each of $R^5$ and $R^6$ is independently a hydrogen atom or an alkyl group having 1, 2, 3, or 4 carbon atoms. Each of the aforementioned alkyl groups may be the same or different from one another and each may independently be linear, branched, or cyclic. Typically, relative to formula (b), the compound is further defined as a dimethylaminoethyl methacrylate or diethylaminoethyl methacrylate or a combination thereof. The structures of these compounds are set forth immediately below:

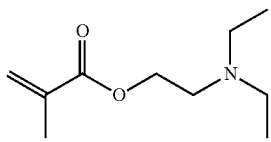

diethylaminoethyl methacrylate

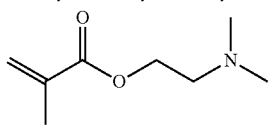

dimethylaminoethyl methacrylate

Without intending to be bound by any particular theory, it is believed that these amines contribute to the oxidative stability of the additive and the composition, impart dispersancy to the composition, and increase the thickening ability of the composition.

Additional Embodiments

In one embodiment, the weight percent of methyl methacrylate is further defined as about 5 to about 10 weight percent, based on a total weight of the viscosity improver, the $C_8$-$C_{10}$ alkyl (meth)acrylate is further defined as 2-propylheptylmethacrylate, and the weight percent of the 2-propylheptylmethacrylate is further defined as about 5 weight percent based on a total weight of the viscosity improver. In another related embodiment, the free-radical polymerization product is further defined as a free-radical polymerization product of the methyl methacrylate, the 2-propylheptylmethacrylate, and about 75 to about 80 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In another embodiment, the weight percent of methyl methacrylate is further defined as about 5 to about 10 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 20 to about 25 weight percent based on a total weight of the viscosity improver. In a related embodiment, the free-radical polymerization product is further defined as a free-radical polymerization product of the methyl methacrylate, the 2-propylheptylmethacrylate, and about 65 to about 70 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In a further embodiment, the weight percent of methyl methacrylate is further defined as about 5 to about 10 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 40 to about 45 weight percent based on a total weight of the viscosity improver. In a related embodiment, the free-radical polymerization product is further defined as a free-radical polymerization product of the methyl methacrylate, the 2-propylheptylmethacrylate, and about 40 to about 45 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In still a further embodiment, the weight percent of methyl methacrylate is further defined as about 5 to about 10 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 60 to about 70 weight percent based on a total weight of the viscosity improver. In a related embodiment, the free-radical polymerization product is further defined as a free-radical polymerization product of the methyl methacrylate, the 2-propylheptylmethacrylate, and about 20 to about 25 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In another embodiment, the weight percent of methyl methacrylate is further defined as about 10 to about 15 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 5 weight percent based on a total weight of the viscosity improver. In a related embodiment, the free-radical polymerization product is further defined as a free-radical polymerization product of the methyl methacrylate, the 2-propylheptylmethacrylate, and about 70 to about 80 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In an additional embodiment, the weight percent of methyl methacrylate is further defined as about 10 to about 15 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 5 to about 10 weight percent based on a total weight of the viscosity improver. In a related embodiment, the free-radical polymerization product is further defined as a free-radical polymerization product of the methyl methacrylate, the 2-propylheptylmethacrylate, and about 70 to about 80 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In a further embodiment, the weight percent of methyl methacrylate is further defined as about 10 to about 15 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 20 to about 40 weight percent based on a total weight of the viscosity improver. In a related embodiment, the free-radical polymerization product is further defined as a free-radical polymerization product of the methyl methacrylate, the 2-propylheptylmethacrylate, and about 40 to about 60 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In an even further embodiment, the weight percent of methyl methacrylate is further defined as about 10 to about 15 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 40 to about 60 weight percent based on a total weight of the viscosity improver. In a related embodiment, the free-radical polymerization product is further defined as a free-radical polymerization product of the methyl methacrylate, the 2-propylheptylmethacrylate, and about 20 to about 40 weight percent of a $C_{12}$-$C_{18}$ alkyl (meth)acrylate based on a total weight of the viscosity improver and/or about 3 to about 7 weight percent of a secondary or tertiary amine functional (meth)acrylate, such as DMAEMA and/or DMAPMA, also based on a total weight of the viscosity improver.

In another embodiment, the weight percent of methyl methacrylate is further defined as about 10 to about 15 weight percent based on a total weight of the viscosity improver, $C_8$-$C_{10}$ alkyl (meth)acrylate is further defined as 2-propylheptylmethacrylate and the weight percent of the 2-propylheptylmethacrylate is further defined as about 5 to about 10 weight percent based on a total weight of the viscosity improver, the free-radical polymerization product is further defined as a free-radical polymerization product of the methyl methacrylate, the 2-propylheptylmethacrylate, and about 75 to about 80 weight percent of a $C_{12}$-$C_{18}$ alkyl (meth)acrylate based on a total weight of the viscosity improver and about 3 to about 5 weight percent of a secondary or tertiary amine functional (meth)acrylate, also based on a total weight of the viscosity improver.

In a further embodiment, the weight percent of methyl methacrylate is further defined as about 5 weight percent based on a total weight of the viscosity improver, the $C_8$-$C_{10}$ alkyl (meth)acrylate is further defined as 2-propylheptyl-methacrylate and the weight percent of the 2-propylheptyl-methacrylate is further defined as about 20 to about 25 weight percent based on a total weight of the viscosity improver, the free-radical polymerization product is further defined as a free-radical polymerization product of the methyl methacrylate, the 2-propylheptylmethacrylate, and about 65 to about 70 weight percent of a $C_{12}$-$C_{18}$ alkyl (meth)acrylate based on a total weight of the viscosity improver and about 3 to about 5 weight percent of a secondary or tertiary amine functional (meth)acrylate, also based on a total weight of the viscosity improver.

In an even further embodiment, the weight percent of methyl methacrylate is further defined as about 10 to about 15 weight percent based on a total weight of the viscosity improver, the $C_8$-$C_{10}$ alkyl (meth)acrylate is further defined as 2-propylheptylmethacrylate and the weight percent of the 2-propylheptylmethacrylate is further defined as about 20 to about 50 weight percent based on a total weight of the viscosity improver, and the free-radical polymerization product is further defined as a free-radical polymerization product of the methyl methacrylate, the 2-propylheptylmethacrylate, and about 35 to about 70 weight percent of a $C_{12}$-$C_{18}$ alkyl (meth)acrylate, also based on a total weight of the viscosity improver.

In still another embodiment, the composition consists essentially of at least about 99 weight percent of base oil and less than or equal to about 1 weight percent of the lubricant additive. In this embodiment, the additive includes about 10 to about 80 weight percent of a diluent oil and about 30 to about 80 weight percent of the viscosity improver, based on a total weight of the additive. Again in this embodiment, the viscosity improver is the free-radical polymerization product of: about 5 to about 15 weight percent of methyl methacrylate, about 5 to about 72 weight percent of a 2-propylheptyl methacrylate, about 20 to about 80 weight percent of lauryl methacrylate, and about 3 to about 8 weight percent of a secondary or tertiary amine functional (meth) acrylate. Also in this embodiment, the viscosity improver has a polydispersity of from about 1.7 to about 3. Moreover, in this embodiment, the composition also includes a pour point depressant.

Additional Components:

In addition to the additive, the composition may also include one or more additional components including, but not limited to, detergents, dispersants, antioxidants, antifoam additives, pour point depressants, anti-wear additives, friction modifiers, and oil or fluid additives know in the art. The composition is not particularly limited in this disclosure so long as it includes the additive. In various embodiments, the composition consists essentially of, or consists of, the base oil, the additive, and one or more of the detergents, dispersants, antioxidants, antifoam additives, pour point depressants, anti-wear additives, friction modifiers, and oil or fluid additives know in the art. In embodiments that consist essentially of the base oil, the additive, and one or more of the aforementioned compounds, the composition is typically free of materials or material compounds that affect the basic properties of the composition including, but not limited to, oil and fluid additives that are not representative of this disclosure, (co)polymers of butyl methacrylate and/or $C_2$-$C_4$ (meth)acrylates, and/or amounts of additives that those of skill in the art would recognize change the basic properties of the additives and/or composition, the ability of the additive to positively affect the non-Newtonian viscometrics of the composition, and/or the ability of the additive to positively affect the Brookfield, kinematic, and other viscosities described above, and/or the DKA oxidation increase, of the composition.

The one or more additional components may be as described in US 2008/0108533 which is incorporated herein by reference. In one embodiment, an additional viscosity index improver and/or a pour point depressant, such as those commercially available from BASF Corporation under the trade name of Irgaflo®, may also be utilized. In other embodiments, the additive, and/or the composition, may include up to 10, 20, 30, 40, 50, or 60, weight percent of the additional viscosity index improver and/or pour point depressant, based on a total weight of the additive and/or composition. Non-limiting examples of the one or more additional components include anti-wear additives, metal passivators, rust inhibitors, dispersants, detergents, and anti-friction additives. The one or more additional components may be ash-containing or ash-less as first introduced and described above. A composition of this type is commonly referred to as an engine oil or as an industrial oil, such as a hydraulic fluid, a turbine oil, an R&O (rust and oxidation inhibited) oil or a compressor oil. In one embodiment, one or more additional components are as described in US 2008/0108533, incorporated herein by reference customary oil additives.

Pour-Point Depressant:

The composition, the additive, or both the composition and the additive may include a pour point depressant. The pour point depressant is not required, is not particularly limited, and may be any known in the art. In one embodiment, the pour point depressant is as described above an includes the free-radical polymerization product of one or more $C_{16}$-$C_{22}$ alkyl (meth)acrylates. In another embodiment, the pour point depressant is present in an amount of 0.5 from 0.5 to 10 weight percent based on a total weight of the composition. In still other embodiments, the pour point depressant is present in amount of from 1 to 9, 2 to 8, 3 to 7, 4 to 6, or 4 to 5, weight percent based on a total weight of the composition.

Anti-Wear Additive:

The anti-wear additive first introduced above is not particularly limited and may be any known in the art. It may be ash-containing or ash-less, as first introduced and described above. In one embodiment, the anti-wear additive is selected from the group of ZDDP, zinc dialkyl-dithio phosphates, and combinations thereof. Alternatively, the anti-wear additive may include sulfur- and/or phosphorus- and/or halogen-containing compounds, e.g. sulfurised olefins and vegetable oils, zinc dialkyldithiophosphates, alkylated triphenyl phosphates, tritolyl phosphate, tricresyl phosphate, chlorinated paraffins, alkyl and aryl di- and trisulfides, amine salts of mono- and dialkyl phosphates, amine salts of methylphosphonic acid, diethanolaminomethyltolyltriazole, bis(2-ethylhexyl)aminomethyltolyltriazole, derivatives of 2,5-dimercapto-1,3,4-thiadiazole, ethyl 3-[(diisopropoxyphosphinothioyl)thio]propionate, triphenyl thiophosphate (triphenylphosphorothioate), tris(alkylphenyl) phosphorothioate and mixtures thereof (for example tris(isononylphenyl) phosphorothioate), diphenyl mononylphenyl phosphorothioate, isobutylphenyl diphenyl phosphorothioate, the dodecylamine salt of 3-hydroxy-1,3-thiaphosphetane 3-oxide, trithiophosphoric acid 5,5,5-tris[isooctyl 2-acetate], derivatives of 2-mercaptobenzothiazole such as 1-[N,N-bis(2-ethylhexyl)aminomethyl]-2-mercapto-1H-1,3-benzothiazole, ethoxycarbonyl-5-octyldithio carbamate, and/or combinations thereof. In one embodiment, the anti-wear additive includes phosphorous and sulfur, e.g. in phosphorothionates and/or dithiophosphate esters.

The anti-wear additive is typically present in the composition in an amount of from 0.1 to 20, from 0.5 to 15, from 1 to 10, from 5 to 10, from 5 to 15, from 5 to 20, from 0.1 to 1, from 0.1 to 0.5, or from 0.1 to 1.5, parts by weight per 100 parts by weight of the composition. Alternatively, the anti-wear additive may be present in amounts of less than 20, less than 15, less than 10, less than 5, less than 1, less than 0.5, or less than 0.1, parts by weight per 100 parts by weight of the composition.

Antioxidants:

Suitable, non-limiting, antioxidants include alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6(1'-methylundec-1'-yl)phenol, 2,4-dimethyl-6-(1'-methylheptadec-1'-yl)phenol, 2,4-dimethyl-6-(1'-methyltridec-1'-yl)phenol, and combinations thereof.

Other non-limiting examples of suitable antioxidants includes alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol, and combinations thereof. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate, and combinations thereof, may also be utilized.

Furthermore, hydroxylated thiodiphenyl ethers, for example 2, 2'-thiobis(6-tert-butyl-4-methylphenol), 2,2'-thiobis (4-octylphenol), 4,4'-thiobis (6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide, and combinations thereof, may also be used.

It is also contemplated that alkylidenebisphenols, for example 2, 2'-methylenebis(6-tert-butyl-4-methylphenol), 2,2'-methylenebis (6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis (4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis (5-tert-butyl-4-hydroxy-2-methyl-phenyl)-3-n-dodecylmercapto butane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2- methylphenyl)-4-n-dodecylmercaptobutane, 1,1,5,5-tetra-(5-tert-butyl-4-hydroxy-2-methyl phenyl)pentane, and combinations thereof may be utilized as antioxidants.

O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tris-(3,5-di-tert-butyl-4-hydroxybenzyl)amine, bis(4-tert-butyl-3-hydroxy-2,6-dimethylbenzyl)dithiol terephthalate, bis(3,5-di-tert-butyl-4-hydroxybenzyl)sulfide, isooctyl-3,5di-tert-butyl-4-hydroxy benzylmercaptoacetate, and combinations thereof, may also be utilized.

Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate, and combinations thereof are also suitable for use as antioxidants.

Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl 2,4,6-tris(3,5-di-tert-butyl-4-hydroxyphenylethyl)-1,3,5-triazine, 1,3,5-tris(3,5-di-tert-butyl-4-hydroxyphenyl propionyl)-hexahydro-1,3,5-triazine, 1,3,5-tris(3,5-dicyclohexyl-4-hydroxybenzyl) isocyanurate, and combinations thereof, may also be used.

Additional suitable, but non-limiting examples of antioxidants include aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol, and combinations thereof. Benzylphosphonates, for example dimethyl-2,5-di-tert-butyl-4-hydroxybenzylphosphonate, diethyl-3,5-di-tert-butyl-4-hydroxybenzylphosphonate, dioctadecyl 3,5-di-tert-butyl-4-hydroxybenzylphosphonate, dioctadecyl-5-tert-butyl-4-hydroxy 3-methylbenzylphosphonate, the calcium salt of the monoethyl ester of 3,5-di-tert-butyl-4-hydroxybenzylphosphonic acid, and combinations thereof, may also be utilized. In addition, acylaminophenols, for example 4-hydroxylauranilide, 4-hydroxystearanilide, octyl N-(3,5-di-tert-butyl-4-hydroxyphenyl)carbamate.

Esters of [3-(3,5-di-tert-butyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may also be used. It is further contemplated that esters of β-(5-tert-butyl-4-hydroxy-3-methylphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may be used. Esters of 13-(3,5-dicyclohexyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may also be used. Moreover, esters of 3,5-di-tert-butyl-4-hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, and combinations thereof, may be utilized.

Additional non-limiting examples of suitable antioxidants include those that include nitrogen, such as amides of β-(3,5-di-tert-butyl-4-hydroxyphenyl)propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine. Other suitable non-limiting examples of antioxidant include aminic antioxidants such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N-bis(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino methylphenol, 2,4'-diaminodiphenylmethane, 4,4'-diaminodiphenylmethane, N,N,N',N'-tetramethyl-4,4'-diaminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated isopropyl/isohexyldiphenylamines, mixtures of mono- and dialkylated tert-butyldiphenylamines, 2,3-dihydro-3,3-dimethyl-4H-1,4-benzothiazine, phenothiazine, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethyl piperid-4-yl)sebacate, 2,2,6,6-tetramethylpiperidin-4-one and 2,2,6,6-tetramethyl piperidin-4-ol, and combinations thereof.

Even further non-limiting examples of suitable antioxidants includes aliphatic or aromatic phosphites, esters of thiodipropionic acid or of thiodiacetic acid, or salts of dithiocarbamic or dithiophosphoric acid, 2,2,12,12-tetramethyl-5,9-dihydroxy-3,7,1trithiamidecane and 2,2,15,15-tetramethyl-5,12-dihydroxy-3,7,10,14-tetrathiahexadecane, and combinations thereof. Furthermore, sulfurized fatty esters, sulfurized fats and sulfurized olefins, and combinations thereof, may be used.

The one or more antioxidants are not particularly limited in amount in the composition but are typically present in an amount of from 0.1 to 2, 0.5 to 2, 1 to 2, or 1.5 to 2, parts by weight per 100 parts by weight of the composition. Alternatively, the one or more antioxidants may be present in amounts of less than 2, less than 1.5, less than 1, or less than 0.5, parts by weight per 100 parts by weight of the composition.

Metal Deactivators:

In various embodiments, one or more metal deactivators can be included in the composition. Suitable, non-limiting examples of the one or more metal deactivators include benzotriazoles and derivatives thereof, for example 4- or 5-alkylbenzotriazoles (e.g. triazole) and derivatives thereof, 4,5,6,7-tetrahydrobenzotriazole and 5,5'-methylenebisbenzotriazole; Mannich bases of benzotriazole or triazole, e.g. 1-[bis(2-ethylhexyl)aminomethyl)triazole and 1-[bis(2-ethylhexyl)aminomethyl)benzotriazole; and alkoxyalkylbenzotriazoles such as 1-(nonyloxymethyl)benzotriazole, 1-(1-butoxyethyl)benzotriazole and 1-(1-cyclohexyloxybutyl)triazole, and combinations thereof.

Additional non-limiting examples of the one or more metal deactivators include 1,2,4-triazoles and derivatives thereof, for example 3-alkyl(or aryl)-1,2,4-triazoles, and Mannich bases of 1,2,4-triazoles, such as 1-[bis(2-ethylhexyl)aminomethyl-1,2,4-triazole; alkoxyalkyl-1,2,4-triazoles such as 1-(1-butoxyethyl)-1,2,4-triazole; and acylated 3-amino-1,2,4-triazoles, imidazole derivatives, for example 4, 4'-methylenebis(2-undecyl-5-methylimidazole) and bis[(N-methyl)imidazol-2-yl]carbinol octyl ether, and combinations thereof.

Further non-limiting examples of the one or more metal deactivators include sulfur-containing heterocyclic compounds, for example 2-mercaptobenzothiazole, 2,5-dimercapto-1,3,4-thiadiazole and derivatives thereof; and 3,5-bis[di(2-ethylhexyl)aminomethyl]-1,3,4-thiadiazolin-2-one, and combinations thereof. Even further non-limiting examples of the one or more metal deactivators include amino compounds, for example salicylidenepropylenediamine, salicylaminoguanidine and salts thereof, and combinations thereof.

The one or more metal deactivators are not particularly limited in amount in the composition but are typically present in an amount of from 0.01 to 0.1, from 0.05 to 0.01, or from 0.07 to 0.1, parts by weight per 100 parts by weight of the composition. Alternatively, the one or more metal deactivators may be present in amounts of less than 0.1, of less than 0.7, or less than 0.5, parts by weight per 100 parts by weight of the composition.

Rust Inhibitors and Friction Modifiers:

In various embodiments, one or more rust inhibitors and/or friction modifiers can be included in the composition. Suitable, non-limiting examples of the one or more rust inhibitors and/or friction modifiers include organic acids, their esters, metal salts, amine salts and anhydrides, for example alkyl- and alkenylsuccinic acids and their partial esters with alcohols, diols or hydroxycarboxylic acids, partial amides of alkyl- and alkenylsuccinic acids, 4-nonylphenoxyacetic acid, alkoxy- and alkoxyethoxycarboxylic acids such as dodecyloxyacetic acid, dodecyloxy(ethoxy)acetic acid and the amine salts thereof, and also N-oleoylsarcosine, sorbitan monooleate, lead naphthenate, alkenylsuccinic anhydrides, for example dodecenylsuccinic anhydride, 2-carboxymethyl-1-dodecyl-3-methylglycerol and the amine salts thereof, and combinations thereof. Additional suitable, non-limiting examples of the one or more rust inhibitors and/or friction modifiers include nitrogen-containing compounds, for example, primary, secondary or tertiary aliphatic or cycloaliphatic amines and amine salts of organic and inorganic acids, for example oil-soluble alkylammonium carboxylates, and also 1-[N,N-bis(2-hydroxyethyl)amino]-3-(4-nonylphenoxy)propan-2-ol, and combinations thereof. Further suitable, non-limiting examples of the one or more rust inhibitors and/or friction modifiers include heterocyclic compounds, for example: substituted imidazolines and oxazolines, and 2-heptadecenyl-1-(2-hydroxyethyl)imidazoline, phosphorus-containing compounds, for example: Amine salts of phosphoric acid partial esters or phosphonic acid partial esters, and zinc dialkyldithiophosphates, molybdenum-containing compounds, such as molybdenum dithiocarbamate and other sulfur and phosphorus containing derivatives, sulfur-containing compounds, for example: barium dinonylnaphthalenesulfonates, calcium petroleum sulfonates, alkylthio-substituted aliphatic carboxylic acids, esters of aliphatic 2-sulfocarboxylic acids and salts thereof, glycerol derivatives, for example: glycerol monooleate, 1-(alkylphenoxy)-3-(2-hydroxyethyl)glycerols, 1-(alkylphenoxy)-3-(2,3-dihydroxypropyl) glycerols and 2-carboxyalkyl-1,3-dialkylglycerols, and combinations thereof.

The one or more rust inhibitors and friction modifiers are not particularly limited in amount in the composition but are typically present in an amount of from 0.05 to 0.5, 0.01 to 0.2, from 0.05 to 0.2, 0.1 to 0.2, 0.15 to 0.2, or 0.02 to 0.2, parts by weight per 100 parts by weight of the composition. Alternatively, the one or more rust inhibitors and friction modifiers may be present in amounts of less than 0.5, less than 0.4, less than 0.3, less than 0.2, less than 0.1, less than 0.5, or less than 0.1, parts by weight per 100 parts by weight of the composition.

Dispersants:

In various embodiments, one or more dispersants can be included in the composition. Suitable, non-limiting examples of the one or more dispersants include polybutenylsuccinic amides or -imides, polybutenylphosphonic acid derivatives and basic magnesium, calcium and barium sulfonates and phenolates, succinate esters and alkylphenol amines (Mannich bases), and combinations thereof.

The one or more dispersants are not particularly limited in amount in the composition but are typically present in an amount of from 0.1 to 5, from 0.5 to 4.5, from 1 to 4, from 1.5 to 3.5, from 2 to 3, or from 2.5 to 3, parts by weight per 100 parts by weight of the composition. Alternatively, the one or more dispersants may be present in an amount of less than 5, 4.5, 3.5, 3, 2.5, 2, 1.5, or 1, part by weight per 100 parts by weight of the composition.

Detergents:

In various embodiments, one or more detergents can be included in the composition. Suitable, non-limiting examples of the one or more detergents include overbased or neutral metal sulphonates, phenates and salicylates, and combinations thereof.

The one or more detergents are not particularly limited in amount in the composition but are typically present in an amount of from 0.1 to 5, from 0.5 to 4.5, from 1 to 4, from 1.5 to 3.5, from 2 to 3, or from 2.5 to 3, parts by weight per 100 parts by weight of the composition. Alternatively, the one or more detergents may be present in an amount of less than 5, 4.5, 3.5, 3, 2.5, 2, 1.5, or 1, part by weight per 100 parts by weight of the composition.

In various embodiments, the composition is substantially free of water, e.g. includes less than 5, 4, 3, 2, or 1, weight percent of water based on a total weight of the composition. Alternatively, the composition may include less than 0.5 or 0.1 weight percent of water, based on a total weight of the composition, or may be free of water.

Some of the compounds described above may interact in the composition, such that the components of the composition in final form may be different from those compounds that are initially added or combined together. Some products formed thereby, including products formed upon employing the composition of this disclosure in its intended use, are not easily described or describable. Nevertheless, all such modifications, reaction products, and products formed upon employing the composition of this disclosure in its intended use, are expressly contemplated and hereby included herein. Various embodiments of this disclosure include one or more of the modification, reaction products, and products formed from employing the composition, as described above.

Each of the composition and/or additive may be independently further defined as ash-containing or ash-less, according to ASTM D 874 and known in the art. Typically, the terminology "ash-less" refers to the absence of (significant) amounts of metals such as sodium, potassium, calcium, and the like. Of course, it is to be understood that the composition and/or additive are not particularly limited to being defined as either ash-containing or ash-less.

Method of Forming the Additive and Composition:

This disclosure also provides a method of forming the additive and a method of forming the composition. The method of forming the additive includes the step of providing the diluent oil, the methyl methacrylate and the $C_8$-$C_{10}$ alkyl (meth)acrylate, and a free-radical initiator. The diluent oil, the methyl methacrylate, the $C_8$-$C_{10}$ alkyl (meth)acrylate, and the free-radical initiator may be provided individually, all together, or in one or more combinations with each other. In addition, each may be provided in one or more portions again individually, all together, or in one or more combinations with each other.

The method also includes the steps of flowing the diluent oil into a reactor, flowing the methyl methacrylate and the $C_8$-$C_{10}$ alkyl (meth)acrylate into the reactor independently from the free-radical initiator, and flowing the free-radical initiator into the reactor. In the method, upon combination of the diluent oil, the methyl methacrylate, the $C_8$-$C_{10}$ alkyl (meth)acrylate, and the free-radical initiator, a free-radical polymerization reaction is initiated and the random co-polymeric viscosity index improver is formed. Each of the diluent oil, the methyl methacrylate and the $C_8$-$C_{10}$ alkyl (meth)acrylate may be flowed into the reactor individually, all together, or in one or more combinations with each other. In addition, each may be flowed into the reactor in one or more portions again individually, all together, or in one or more combinations with each other. In one embodiment, the methyl methacrylate and the $C_8$-$C_{10}$ alkyl (meth)acrylate are flowed together. In another embodiment, the methyl methacrylate and the $C_8$-$C_{10}$ alkyl (meth)acrylate are flowed separately.

In one embodiment, the $C_{12}$-$C_{18}$ alkyl (meth)acrylate is also provided and flowed into the reactor. Just as above, the $C_{12}$-$C_{18}$ alkyl (meth)acrylate may be provided and/or flowed into the reactor individually, all together with other components, and/or in one or more combinations with the diluent oil, the methyl methacrylate, or the $C_8$-$C_{10}$ alkyl (meth)acrylate. In addition, the $C_{16}$-$C_{22}$ alkyl (meth)acrylate may also be provided and flowed into the reactor. Just as above, the $C_{16}$-$C_{22}$ alkyl (meth)acrylate may also be provided and/or flowed in independently or with one or more of the base oil, the methyl methacrylate, the $C_8$-$C_{10}$ alkyl (meth)acrylate, and/or the $C_{12}$-$C_{18}$ alkyl (meth)acrylate.

The free-radical polymerization conditions of this disclosure are not particularly limited and may include typical conditions associated with bulk polymerization, solution polymerization, usually in an organic solvent such as the diluent oil or mineral oil. In one embodiment, the weight ratio of the solvent to total monomer charge may range from about 90:10 to about 60:40. As used herein, the terminology "total monomer charge" typically describes a combined amount of all monomers in an initial, i.e., unreacted, reaction mixture. In one embodiment, all components are charged to a reactor that is equipped with a stirrer, a thermometer and a reflux condenser and heated with stifling under a nitrogen blanket to a temperature from about 50° C. to about 130° C. for a period of about 0.5 hours to about 15 hours to carry out the free-radical polymerization reaction. It is also contemplated that temperatures of from 60 to 120, 70 to 110, 80 to 100, or 90 to 100, ° C., may be utilized. Similarly, the reaction may proceed for a time of from 1 to 14, 2 to 13, 3 to 12, 4 to 11, 5 to 10, 6 to 9, or 7 to 8, hours. In another embodiment, the polymerization conditions are as described in US 2008/0108533, which is incorporated herein by reference relative to these conditions.

Referring back to the free-radical initiator, this compound is not particularly limited in this disclosure and may be further defined as one or more of halogens, azo compounds such as AIBN and ABCN, organic peroxides, and combinations thereof. Organic peroxides include a peroxide bond (—O—O—), which is readily cleaved to give two oxygen-centered radicals. In various embodiments, the free-radical initiator of this disclosure is further defined as di-t(tertiary)-butylperoxide, benzoyl peroxide, methyl ethyl ketone peroxide, 1,1-di(t-amylperoxy)cyclohexane, 1,1-di(t-butylperoxy)-3,3,5-trimethylcyclohexane, 2,2'-azobis(isobutyronitrile), 2,2-di(t-amylperoxy)propane, 2,2-di(t-butylperoxy)butane, 2,5-dimethyl-2,5-di(2-ethylhexanoylperoxy)hexane, 2,5-dimethyl-2,5-di(benzoylperoxy)hexane, 2,5-dimethyl-2,5-di(t-butylperoxy)hexane, 2-hydroxy-1,1-dimethyl butyl peroxyneoheptanoate, 3-hydroxy-1,1-dimethylbutyl peroxyneodecanoate, 3-hydroxy-1,1-dimethylbutylperoxy-2-ethylhexanoate, a,a'-bis(t-butylperoxy)diisopropylbenzene, a-cumyl peroxyneodecanoate, a-cumyl peroxy neoheptanoate, di(2-ethylhexyl) peroxydicarbonate, di(3-carboxypropionyl) peroxide, di(n-propyl) peroxydicarbonate, di(sec-butyl) peroxydicarbonate, di(t-amyl) peroxide, di(t-butyl) peroxide, dibenzoyl peroxide, dicumyl peroxide, didecanoyl peroxide, didodecanoyl peroxide, diisononanoyl peroxide, di-t-butyl diperoxyphthalate, ethyl 3,3-di(t-amylperoxy)butyrate, ethyl 3,3-di(t-butylperoxy)butyrate, n-butyl 4,4-di(t-butylperoxy)valerate, OO-t-amyl o-(2-ethylhexyl) monoperoxycarbonate, OO-t-butyl o-isopropyl monoperoxycarbonate, polyether tetrakis(t-butylperoxycarbonate), t-amyl peroxyacetate, t-amyl peroxybenzoate, t-amyl peroxyneodecanoate, t-amyl peroxypivalate, t-amylperoxy 2-ethylhexanoate, t-butyl a-cumyl peroxide, t-butyl peroxy-(cis-3-carboxy)propenoate, t-butyl peroxyacetate, t-butyl peroxybenzoate, t-butyl peroxyisobutyrate, t-butyl peroxyisononanoate, t-butyl peroxyneodecanoate, t-butyl peroxyneoheptanoate, t-butyl peroxypivalate, t-butylperoxy 2-ethylhexanoate, and combinations thereof.

In various embodiments, the free-radical initiator is utilized in combination with a chain transfer agent and a solvent. Suitable chain transfer agents include, but are not limited to, dodecane thiol, mercaptans and alcohols such as tridecyl mercaptan, dodecyl mercaptan and ethyl mercaptan. The selection of the amount of chain transfer agent to be used can be based on a desired molecular weight of the copolymer as well as a desired level of shear stability for the copolymer. In various embodiments, the chain transfer agent is utilized in amounts of 0.01 to 3 weight percent relative to a total weight of the copolymer. The solvent introduced above is not particularly limited and may be further defined as the base oil described above, mineral oil, acetone, alpha-methylstyrene, benzene, decane, dodecane, ethylbenzene, toluene, trichloroethylene, and combinations thereof. Accordingly, in various embodiments, the method also includes the steps of providing and flowing the chain transfer agent and/or the solvent into the reactor. Each of the chain transfer agent and/or the solvent, if utilized, may be combined with each other and flowed into the reactor together, may be flowed into the reactor independently, and/or may be flowed into the reactor as combined with any one or more of the aforementioned components used to form the additive. Each of the aforementioned components, including the diluent oil, the methyl methacrylate, the $C_8$-$C_{10}$ alkyl (meth)acrylate, the $C_{12}$-$C_{18}$ alkyl (meth)acrylate, the $C_{16}$-$C_{22}$ alkyl (meth)acrylate, the free-radical initiator, the solvent, and the chain transfer agent, may be flowed continuously into the reactor or in one or more batches and in any order.

The method of forming the composition is also not particularly limited and typically includes the step of combining the additive and the base oil. The additive and the base oil may be combined using any techniques known in the art. The method of forming the composition may include combining one or more of the aforementioned "additional components" with the base oil and/or the additive.

EXAMPLES

A series of lubricant additives (Additives 1-63) are formed according to this disclosure. A series of comparative lubricant additives (Comparative Additives 1-3) are also formed but do not represent this disclosure. After formation, the Additives and Comparative Additives are evaluated to determine number average molecular weight (Mn), weight average molecular weight (Mw), and polydispersity index (PDI).

More specifically, to form each of the Additives and Comparative Additives, a quantity of diluent oil is charged to a reactor and heated to about 95° C. under nitrogen. Subsequently, a free-radical initiator is charged to the reactor. Two separate parallel feeds are then set up for metering into the reactor. The first feed includes a quantity of MMA, 2-PHMA, and a chain transfer agent, and optionally a charge of LMA and/or a 2° or 3° amine functional (meth)acrylate. The second feed includes an additional quantity of the free-radical initiator. The two feeds are metered into the reactor over a time of about 6 hours. Both the first and second feeds are started simultaneously. The specific amounts of each of the compounds used to form the Additives and the Comparative Additives are set forth in Table 1 below along with the respective values for Mn, Mw, and PDI.

TABLE 1

| | Wt % MMA | Wt % 2-PHMA | Wt % LMA | Wt % 2° or 3° Amine | Wt % Copolymer | Mn | Mw | PDI |
|---|---|---|---|---|---|---|---|---|
| Additive | | | | | | | | |
| Additive 1 | 5 | 23 | 69 | 3.5 | 35 | 29763 | 83689 | 2.81 |
| Additive 2 | 5 | 23 | 69 | 3.5 | 35 | 31314 | 78223 | 2.50 |
| Additive 3 | 5 | 23 | 69 | 3.5 | 35 | 33424 | 71523 | 2.14 |
| Additive 4 | 5 | 23 | 69 | 3.5 | 35 | 31048 | 65170 | 2.10 |
| Additive 5 | 5 | 23 | 68 | 4.2 | 40 | 27308 | 64243 | 2.35 |
| Additive 6 | 5 | 23 | 68 | 4.2 | 40 | 24722 | 67650 | 2.74 |
| Additive 7 | 5 | 23 | 69 | 3.5 | 40 | 39311 | 96515 | 2.46 |
| Additive 8 | 5 | 23 | 69 | 3.5 | 40 | 39763 | 89109 | 2.24 |
| Additive 9 | 5 | 23 | 68 | 4.2 | 40 | 25524 | 58977 | 2.31 |
| Additive 10 | 5 | 23 | 68 | 4.2 | 40 | N/A* | N/A* | N/A* |
| Additive 11 | 5 | 23 | 69 | 3.4 | 40 | 35367 | 78925 | 2.23 |
| Additive 12 | 5 | 23 | 69 | 3.4 | 40 | N/A* | N/A* | N/A* |
| Additive 13 | 5 | 23 | 69 | 3.5 | 40 | 17764 | 37106 | 2.09 |
| Additive 14 | 5 | 23 | 69 | 3.5 | 40 | 61590 | 233097 | 3.78 |
| Additive 15 | 5 | 22 | 66 | 7 | 50 | 34506 | 74801 | 2.17 |
| Additive 16 | 5 | 22 | 66 | 7 | 50 | 36130 | 75747 | 2.10 |
| Additive 17 | 5 | 66 | 22 | 7 | 50 | 23993 | 44596 | 1.86 |
| Additive 18 | 5 | 66 | 22 | 7 | 50 | 27202 | 482831 | 17.75 |
| Additive 19 | 5 | 66 | 22 | 7 | 50 | 33275 | 65497 | 1.97 |
| Additive 20 | 5 | 66 | 22 | 7 | 50 | 29456 | 54464 | 1.85 |
| Additive 21 | 5 | 66 | 22 | 7 | 50 | 42089 | 91725 | 2.18 |
| Additive 22 | 5 | 66 | 22 | 7 | 50 | 45781 | 86066 | 1.88 |
| Additive 23 | 5 | 46 | 46 | 3.5 | 50 | 28578 | 54941 | 1.92 |
| Additive 24 | 5 | 69 | 23 | 3.5 | 50 | 27865 | 53032 | 1.90 |
| Additive 25 | 5 | 46 | 46 | 3.5 | 50 | 31608 | 66050 | 2.09 |
| Additive 26 | 5 | 69 | 23 | 3.5 | 50 | 33682 | 79771 | 2.37 |
| Additive 27 | 5 | 69 | 23 | 3.5 | 50 | 33274 | 84174 | 2.53 |
| Additive 28 | 5 | 46 | 46 | 3.5 | 50 | 32605 | 78967 | 2.42 |
| Additive 29 | 5 | 46 | 46 | 3.5 | 50 | 46446 | 100196 | 2.16 |
| Additive 30 | 5 | 69 | 23 | 3.5 | 50 | 33022 | 87180 | 2.64 |
| Additive 31 | 5 | 69 | 23 | 3.5 | 50 | 32172 | 91583 | 2.85 |
| Additive 32 | 5 | 46 | 46 | 3.5 | 50 | 28318 | 80357 | 2.84 |
| Additive 33 | 5 | 23 | 69 | 3.5 | 50 | 38365 | 88978 | 2.32 |
| Additive 34 | 5 | 23 | 69 | 3.5 | 50 | 28780 | 77036 | 2.68 |
| Additive 35 | 5 | 23 | 69 | 3.5 | 50 | 31346 | 66719 | 2.13 |

TABLE 1-continued

| | Wt % MMA | Wt % 2-PHMA | Wt % LMA | Wt % 2° or 3° Amine | Wt % Copolymer | Mn | Mw | PDI |
|---|---|---|---|---|---|---|---|---|
| Additive 36 | 5 | 23 | 69 | 3.5 | 50 | 30666 | 58537 | 1.91 |
| Additive 37 | 10 | 69 | 23 | 3.5 | 50 | 35611 | 96571 | 2.71 |
| Additive 38 | 10 | 65 | 22 | 3.5 | 50 | 30897 | 73681 | 2.38 |
| Additive 39 | 10 | 43 | 43 | 3.5 | 50 | 27768 | 83136 | 2.99 |
| Additive 40 | 10 | 43 | 43 | 3.5 | 50 | 30718 | 71143 | 2.32 |
| Additive 41 | 13 | 42 | 42 | 3.5 | 60 | 12532 | 21926 | 1.75 |
| Additive 42 | 5 | 66 | 22 | 7 | 70 | 34315 | 69808 | 2.03 |
| Additive 43 | 13 | 42 | 42 | 3.5 | 70 | 13421 | 23640 | 1.76 |
| Additive 44 | 13 | 63 | 21 | 3.5 | 70 | 12940 | 22328 | 1.73 |
| Additive 45 | 13 | 84 | — | 3.5 | 70 | 12564 | 21809 | 1.74 |
| Additive 46 | 13 | 63 | 21 | 3.5 | 70 | 15382 | 27530 | 1.79 |
| Additive 47 | 13 | 5 | 78 | 3.5 | 70 | 19078 | 32929 | 1.73 |
| Additive 48 | 13 | 5 | 78 | 3.5 | 70 | 20259 | 36059 | 1.78 |
| Additive 49 | 5 | 66 | 22 | 7 | 75 | 36105 | 72914 | 2.02 |
| Additive 50 | 13 | 63 | 21 | 3.5 | 75 | 13698 | 24081 | 1.76 |
| Additive 51 | 13 | 22 | 65 | — | 80 | 15481 | 27444 | 1.77 |
| Additive 52 | 13 | 44 | 44 | — | 80 | 15029 | 26236 | 1.75 |
| Additive 53 | 13 | 42 | 42 | 3.5 | 80 | 25392 | 48960 | 1.93 |
| Additive 54 | 13 | 42 | 42 | 3.5 | 80 | 21654 | 40085 | 1.85 |
| Additive 55 | 13 | 42 | 42 | 3.5 | 80 | 16155 | 28918 | 1.79 |
| Additive 56 | 13 | 42 | 42 | 3.5 | 80 | 19677 | 36274 | 1.84 |
| Additive 57 | 13 | 21 | 63 | 3.5 | 80 | 16819 | 29274 | 1.74 |
| Additive 58 | 13 | 21 | 63 | 3.5 | 80 | 19666 | 36747 | 1.87 |
| Additive 59 | 13 | 31 | 52 | 3.5 | 80 | 19727 | 36339 | 1.84 |
| Additive 60 | 13 | 31 | 52 | 3.5 | 80 | 16381 | 29485 | 1.80 |
| Additive 61 | 13 | 5 | 78 | 3.5 | 80 | 16585 | 30238 | 1.82 |
| Additive 62 | 13 | 5 | 75 | 7 | 80 | 13905 | 24623 | 1.77 |
| Additive 63 | 13 | 87 | — | — | 80 | 15516 | 27140 | 1.75 |
| Comparative Additive | | | | | | | | |
| Comp. Additive 1 | 13 | — | 87 | — | 80 | 15516 | 27140 | 1.63 |
| Comp. Additive 2 | 20 | — | 80 | — | 80 | 13126 | 21387 | 1.63 |
| Comp. Additive 3 | 13 | — | 83.5 | 3.5 | 80 | 12061 | 19988 | 1.66 |

*Sample does not dissolve in THF such that no Mn, Mw, or PDI data available. However, the sample is still suitable for formation of a Composition, if desired Wt % MMA represents the weight percent of methyl methacrylate used to form the Additives and some of the Comparative Additives.

Wt % 2-PHMA represents the weight percent of 2-propylheptyl methacrylate (i.e., a $C_8$-$C_{10}$ alkyl (meth)acrylate) used to form the Additives and some of the Comparative Additives.

Wt % LMA represents the weight percent of lauryl methacrylate (i.e., a $C_{12}$-$C_{18}$ alkyl (meth)acrylate) used to form some of the Additives and some of the Comparative Additives.

Wt % 2° or 3° Amine represents the weight percent of the secondary or tertiary amine functional (meth)acrylates used to form some of the Additives and some of the Comparative Additives. More specifically, Additives 1-14 and 23-40 are formed using dimethylaminopropyl methacrylate (DMAPMA). Additives 15-22, 41-47, 49, 50 and 53-62 are formed using dimethylaminoethyl methacrylate (DMAEMA). Additive 48 is formed using diethylaminopropyl methacrylate. Comparative Additive 3 is formed using DMAPMA.

Wt % Copolymer represents the weight percent of the copolymer use to form the Additives and the Comparative Additives with a balance being a diluent oil that may include other non-interacting additives.

$M_n$ represents the number average molecular weight of the Additives and Comparative Additives determined using THF and a method well known in the art.

$M_w$ represents the weight average molecular weight of the Additives and Comparative Additives determined using THF and a method well known in the art.

PDI represents the polydispersity index of the Additives and Comparative Additives.

After formation, amounts select Additives and select Comparative Additives are independently added to a base oil to form corresponding Compositions and Comparative Compositions. The Compositions and Comparative Compositions are then evaluated to determine Brookfield Viscosity at −40° C. according to ASTM D2983 and kinematic viscosity at 100° C. according to ASTM D445. The specific amounts (Treat Rate) of each of the Additives used to form the Compositions and the Comparative Compositions are set forth in Table 2 below along with the respective values for kinematic viscosity and Brookfield Viscosity.

TABLE 2

| Composition | Kinematic Viscosity of Oil without Additive at 100° C. (mm²/s) | Treat Rate of Additives in Compositions | Kinematic Viscosity at 100° C. of Composition (mm²/s) | Brookfield Viscosity at −40° C. of Composition (mPa·s) |
|---|---|---|---|---|
| Composition 51 | ~4 | 5.8 | 5.68 | 8468 |
| Composition 52 | ~4 | 5.82 | 5.65 | 9768 |
| Composition 55 | ~4 | 5.24 | 5.67 | 10438 |
| Composition 56 | ~4 | 4.81 | 5.65 | 10378 |
| Composition 61 | ~4 | 5.4 | 5.63 | 9738 |
| Composition 62 | ~4 | 6.25 | 5.69 | 11238 |

TABLE 2-continued

| Comparative Composition | Kinematic Viscosity of Oil without Additive at 100° C. (mm²/s) | Treat Rate of Additives in Comparative Compositions | Kinematic Viscosity at 100° C. of Comparative Composition (mm²/s) | Brookfield Viscosity at −40° C. of Comparative Composition (mPa · s) |
|---|---|---|---|---|
| Comp. Composition 1 | ~4 | 6.55 | 5.63 | 77184 |
| Comp. Composition 2 | ~4 | 7.6 | 5.64 | >100,000 |
| Comp. Composition 3 | ~4 | 7.94 | 5.65 | >100,000 |

Kinematic Viscosity of the Oil without the Additive is an approximate measurement of the kinematic viscosity before addition of the Additive to demonstrate that use of the Additive increases the Kinematic Viscosity of the Compositions.

Treat Rate represents the weight percent of the Additive or Comparative Additive that is combined with a balance of the base oil to form the Compositions and Comparative Compositions.

Kinematic Viscosity at 100° C. of Composition represents the kinematic viscosity of the Compositions and Comparative Composition measured according to ASTM D445. Compositions are formulated to approximately equivalent kinematic viscosities and Treat Rate.

Brookfield Viscosity at −40° C. represents the Brookfield Viscosity of the Compositions and Comparative Compositions measured at −40° C. using an uninsulated No. 4 LV or an insulated No. 4B2 spindle and a speed of rotation that ranges from about 0.6 rpm for a fluid with a viscosity range of from about 400,000 to about 1,000,000 mPa·s to about 60.0 rpm for a fluid with a viscosity range of about 500 to about 9,800 mPa·s. according to ASTM D2983. Lower values are superior to higher values.

The data set forth above shows that the Additives of this disclosure can be effectively formed with narrow polydispersity indices. In addition, the data shows that the Compositions of this disclosure generally outperform the Comparative Compositions relative to Brookfield Viscosity and Treat Rate to achieve a particular Kinematic Viscosity. In sum, the Compositions of this disclosure have excellent non-Newtonian viscometrics and low temperature viscosity. As compared to the Comparative Additives, the Additives of this disclosure are superior.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

In addition, it is contemplated that the weight percents or other numerical values or ranges of values described above may vary and may be further defined as any value or range of values, both whole and fractional, within those ranges and values described above and/or may vary from the values and/or range of values above by ±5%, ±10%, ±15%, ±20%, ±25%, ±30%, etc, so long as the variations remain within the scope of the disclosure. As one example, any of the numerical values or ranges described herein may be further defined as "about" and, as such, may vary in accordance with this paragraph.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A lubricant composition having improved non-Newtonian viscometrics and comprising:
    A. at least 85 weight percent of base oil based on a total weight of said composition; and
    B. 2 to 10 weight percent of a lubricant additive based on a total weight of said composition and comprising;
        (i) 10 to 80 weight percent of a diluent oil based on a total weight of said additive, and
        (ii) 50 to 80 weight percent of a random co-polymeric viscosity index improver based on a total weight of said additive, said viscosity index improver being the free-radical polymerization product of at least:
            a) 5 to 13 weight percent of methyl methacrylate based on a total weight of the viscosity index improver, b) 5 to 66 weight percent of 2-propylheptyl methacrylate based on a total weight of the viscosity index improver, c) 21 to 78 weight percent of a $C_{12}$-$C_{18}$ alkyl (meth)acrylate based on a total weight of the viscosity index improver, and d) optionally 3.5 to 7 weight percent of a secondary or tertiary amine functional (meth)acrylate based on a total weight of said viscosity index improver; and wherein said lubricant composition has a Brookfield Viscosity of less than 23,000 mPa·s measured at −40° C. according to ASTM D2983, and wherein said $C_{12}$-$C_{18}$ alkyl (meth)acrylate comprises 62 to 78 wt % of molecules having $C_{12}$ chain length, 22 to 38 wt % of molecules having $C_{14}$ chain length, 0 to 10 wt % of molecules having $C_{16}$ chain length, and 0 to 10 wt % of molecules having $C_{18}$ chain length.

2. A lubricant composition as set forth in claim 1 having a kinematic viscosity of 2 to 50 mm$^2$/s measured at 100° C. according to ASTM D445.

3. A lubricant composition as set forth in claim 2 having a DKA oxidation increase of less than 30 percent measured according to CEC-L-48-00.

4. A lubricant composition as set forth in claim 3 wherein said viscosity index improver has a number average molecular weight of from about 10,000 to about 200,000 g/mol and a weight average molecular weight of from about 20,000 to about 500,000 g/mol.

5. A lubricant composition as set forth in claim 3 wherein said viscosity index improver has a number average molecular weight of from about 10,000 to about 15,000 g/mol and a weight average molecular weight of from about 20,000 to about 30,000 g/mol.

6. A lubricant composition as set forth in claim 3 wherein said viscosity index improver has number average molecular weight of from about 10,000 to about 30,000 g/mol, a weight average molecular weight of from about 20,000 to about 50,000 g/mol, and polydispersity index of from about 1.7 to about 1.8.

* * * * *